United States Patent
Machac, Jr. et al.

(10) Patent No.: US 6,833,345 B2
(45) Date of Patent: Dec. 21, 2004

(54) DEGREASING COMPOSITIONS

(75) Inventors: James R. Machac, Jr., Lago Vista, TX (US); Edward T. Marquis, Austin, TX (US); Susan A. Woodrum, Round Rock, TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 323 days.

(21) Appl. No.: 10/061,536

(22) Filed: Feb. 1, 2002

(65) Prior Publication Data

US 2002/0111284 A1 Aug. 15, 2002

Related U.S. Application Data

(60) Division of application No. 09/654,438, filed on Sep. 1, 2000, now Pat. No. 6,395,103, which is a continuation-in-part of application No. 09/335,597, filed on Jun. 18, 1999, now Pat. No. 6,159,915, which is a continuation-in-part of application No. 09/083,402, filed on May 22, 1998, now Pat. No. 6,040,298.
(60) Provisional application No. 60/048,450, filed on Jun. 3, 1997, provisional application No. 60/047,529, filed on May 23, 1997, and provisional application No. 60/130,061, filed on Apr. 19, 1999.

(51) Int. Cl.$^7$ ............................. C11D 7/50; C09D 9/00
(52) U.S. Cl. ..................... 510/365; 510/201; 510/202; 510/206; 510/212; 510/407; 510/432; 510/505; 134/38
(58) Field of Search ............................... 510/201, 202, 510/206, 212, 365, 407, 432, 505; 134/38

(56) References Cited

U.S. PATENT DOCUMENTS

| | | |
|---|---|---|
| 3,285,777 A | 11/1966 | Kahn et al. |
| 3,355,385 A | 11/1967 | Mackley |
| 3,843,578 A | 10/1974 | Logemann et al. |
| 3,925,008 A | 12/1975 | Makino et al. |
| 3,954,648 A | 5/1976 | Belcak et al. |
| 4,508,634 A | 4/1985 | Elepano et al. |
| 4,561,898 A | 12/1985 | Fehr et al. |
| 4,594,111 A | 6/1986 | Coonan |
| 4,780,235 A | 10/1988 | Jackson |
| 4,927,556 A | 5/1990 | Pokorny |
| 4,956,115 A | 9/1990 | Van De Mark |
| 5,006,279 A | 4/1991 | Grobbel et al. |
| 5,084,200 A | 1/1992 | Dishart et al. |
| 5,085,795 A | 2/1992 | Narayanan et al. |
| 5,098,591 A | 3/1992 | Stevens |
| 5,098,594 A | 3/1992 | Doscher |
| 5,106,525 A | 4/1992 | Sullivan |
| 5,179,224 A | 1/1993 | Takaki et al. |
| 5,215,675 A | 6/1993 | Wilkins et al. |
| 5,331,103 A | 7/1994 | Costantini et al. |
| 5,334,331 A | 8/1994 | Fusiak |
| 5,414,153 A | 5/1995 | Costantini et al. |
| 5,415,153 A | 5/1995 | Johnson et al. |
| 5,425,893 A | 6/1995 | Stevens |
| 5,427,710 A | 6/1995 | Stevens |
| 5,585,526 A | 12/1996 | Costantini et al. |
| 5,597,788 A | 1/1997 | Stevens |
| 5,721,204 A | 2/1998 | Maxwell et al. |
| 5,728,666 A | 3/1998 | Vitomir |
| 5,741,368 A | 4/1998 | Sahbari |
| 5,792,278 A | 8/1998 | Wojcik |
| 5,814,163 A | 9/1998 | Wojcik |
| 6,103,682 A | 8/2000 | Lallier |
| 6,395,103 B1 * | 5/2002 | Machac et al. ............... 134/40 |
| 6,479,445 B1 * | 11/2002 | Machac et al. ............. 510/206 |

FOREIGN PATENT DOCUMENTS

| | | |
|---|---|---|
| EP | 0 845 525 A2 | 6/1998 |
| JP | 01029476 A * | 1/1989 |
| WO | WO 91/03522 | 3/1991 |
| WO | WO 92/19710 | 11/1992 |
| WO | WO 97/29158 | 8/1997 |

* cited by examiner

*Primary Examiner*—Gregory Webb
(74) *Attorney, Agent, or Firm*—O'Keefe, Egan & Peterman LLP

(57) ABSTRACT

A composition useful as a paint remover which may include a carbonate, a dibasic ester and a mono-ester. The paint stripping composition may also contain an organic sulfur-containing compound such as dimethyl sulfoxide (DMSO), a glycol ether, a ketone, or combination thereof. The composition may be used in a process for removing paint by applying it to a painted surface. A degreasing composition is also disclosed which may comprise a carbonate and a alkyl-substituted cyclo-alkane such as naphthene. The compositions have several important attributes, including low toxicity and high efficacy in removing paint and coatings.

27 Claims, No Drawings

DEGREASING COMPOSITIONS

This application is a divisional of application Ser. No. 09/654,438, filed Sep. 1, 2000, now U.S. Pat. No. 6,395,103 which is a continuation-in-part of application Ser. No. 09/335,597, filed Jun. 18, 1999, now U.S. Pat. No. 6,159,915, which claims priority to Ser. No. 60/130,061 filed Apr. 19, 1999 and which is a continuation-in-part of Ser. No. 09/083,402, filed May 22, 1998, now U.S. Pat. No. 6,040,298 which claims priority to Ser. No. 60/047,529 filed May 23, 1997, and Ser. No. 60/048,450 filed Jun. 3, 1997, incorporated herein by reference.

BACKGROUND OF INVENTION

This invention relates to compositions for degreasing, paint removal, coating removal, and the like. More particularly, this invention relates to compositions containing a carbonate such as alkylene carbonate or dialkyl carbonate or both, and one or more other components such as a dibasic ester and a mono-ester, or a hydrogenated hydrocarbon solvent such as a naphthene.

Paint removing compositions are commonly used in industry, such as for stripping paint from airplane fuselages. Conventional paint remover compositions include methylene chloride, phenol, or caustic. Each of these materials, however, has inherent problems during use. While methylene chloride based compositions are very effective as paint removers, methylene chloride is a highly volatile material which is considered toxic. Similarly, phenol is highly toxic. Furthermore, caustic causes burns and attacks aluminum. Due to the deficiencies and disadvantages of conventional paint removing compositions, new paint removing compositions are highly desirable.

Another area where solvents find significant commercial interest is in the area of degreasing. Degreasing compositions are well known and commonly used in industry. For example, fluorinated hydrocarbons and chlorinated hydrocarbons such as methylene chloride have been used for this purpose. However, as stated above, methylene chloride is a highly volatile material which is considered toxic. A need exists for degreasers that are neither as volatile nor as toxic as conventional degreasers such as chlorinated hydrocarbons.

SUMMARY OF INVENTION

The invention provides a solution to one or more of the problems and disadvantages discussed above.

This invention pertains to certain compositions useful as paint removers, and processes thereof. This invention also pertains to other compositions that are useful as degreasers, and processes thereof.

Paint Removers

In one broad respect, this invention is a composition useful as a paint remover, comprising: a carbonate, a dibasic ester and a mono-ester. In one embodiment, the composition may also contain an organic sulfur-containing compound, a glycol ether, a ketone, or combination thereof.

In another broad respect, this invention is a process for removing paint, comprising: applying a composition to a painted surface for a time and under conditions effective to cause blistering or bubbling of the paint, wherein the composition comprises a carbonate, a dibasic ester and a mono-ester.

In another broad respect, this invention is a process for removing a coating from a surface, comprising: providing a composition containing a carbonate, a dibasic ester and a mono-ester; adding a thickening agent to the composition and mixing the resulting composition to form a thickened composition; applying the thickened composition to a coated surface for a time sufficient and under conditions effective to separate at least a portion of the coating from the surface; and removing the coating and thickened composition from the surface.

In another broad respect, this invention is a process of the manufacture of a paint stripper, comprising: combining a carbonate, a dibasic ester and a mono-ester in amount and under conditions effective to form a miscible composition. The combining of the components may be effected as by stirring, typically at the ambient atmospheric pressure and temperature. The composition may include additional components as disclosed herein.

The surfaces to be treated may be sealed with a variety of sealants, such as polysulfide, polyurethane, lacquer, epoxy, and the like. The compositions can be used to remove paints and coatings from furniture, automobiles, boats, trains, airplanes, military vehicles, and so forth.

This invention has a number of advantages. For example, the compositions have several important attributes, including low toxicity, high efficacy in removing paint and coatings. It has further been advantageously found that the compositions may be blended with additional co-solvents, activators, corrosion inhibitors, and the like, or may be used directly to effect paint removal. Furthermore, in the case of propylene carbonate, the propylene carbonate breaks down into propylene glycol, which is non-toxic. Hence, the propylene carbonate compositions of this invention are environmentally friendly, particularly as compared to chlorinated hydrocarbons and the like which are commonly used for paint and coating removing. The compositions of this invention may advantageously be of low volatility and free of carcinogenic chemicals.

Degreasing Compositions

In yet another broad respect, this invention is a composition useful as a degreaser, comprising: a carbonate and a alkyl-substituted cyclo-alkane such as naphthene, which is often made by hydrogenation of alkylated benzene such as toluene, xylene, ethyl benzene, ethyl toluene, and ethyl xylene, or of alkylated cyclopentene. Thus, the alkyl-substituted cyclo-alkanes used in the practice of this invention typically have one or more alkyl groups attached to a cyclopentane or cyclohexane ring. This composition may include one or more additional solvents that function as compatibilizers for carbonate and alkyl-substituted cycloalkane composition if such a compatibilizer is needed to form a miscible solution. Thus, the compatibilizers are employed in an amount effective to form a miscible solution between the carbonate and the alkyl-substituted cyclo-alkanes. In general, the alkyl-substituted cycloalkanes has up to about 30 carbons. Such additional solvents may include, for example, glycol ethers, alkyl acetates of oxo alcohols (for example, EXXATE 900, available from Exxon Chemical) such as of formula R—O—C(O)—$CH_3$ where R is alkyl, soy carbonates, alkyl soyates, and alkyl lactates such as ethyl lactate. The base composition may also comprise a soy carbonate as the base solvent.

In another broad respect, this invention is a method useful for removing grease from a substrate, comprising: applying a degreasing composition to a grease on a substrate in an amount and under conditions effective to remove at least a portion of the grease from the substrate, wherein the composition comprises a carbonate and a alkyl-substituted cycloalkane, and optionally a soy carbonate. The composition may include a glycol ether, alkyl acetate, or other compatibilizer. As used herein, soy carbonate refers to alkyl carbonates based on soy epoxides such as the Vikoflex™ epoxides currently available from Elf Atochem. Soy epoxides are based on long chain monounsaturated materials. The epoxides may be converted to carbonates by well known, catalyzed carbon dioxide insertion reactions. Since unsaturated materials from soy oil may contain both terminal and internal ethylenic functionality, the soy carbonate may have terminal functionality or may have branching.

The substrates to be treated to remove grease may be any solid surface, such as made from metal (for example, steel, aluminum, tin, copper, and so forth), glass, concrete, and wood. In most circumstances, it is preferred that the substrate is of a material that does not dissolve by action of the degreasing composition.

In another respect, this invention is a method of manufacturing a degreasing composition, comprising: combining a carbonate and a alkyl-substituted cyclo-alkane and optionally a soy carbonate. Likewise, the composition may be made by further combining the carbonate and the alkyl-substituted cyclo-alkane with a glycol ether, an alkyl acetate, or other compatibilizer. Additional components may also be combined.

This composition comprising carbonate and naphthene has a number of advantages. For example, the compositions have several important attributes, including low toxicity, high efficacy in removing grease. It has further been advantageously found that the compositions may be blended with additional co-solvents, activators, corrosion inhibitors, and the like, or may be used directly to effect degreasing. Furthermore, in the case of propylene carbonate, the propylene carbonate breaks down into propylene glycol, which is non-toxic. Hence, the propylene carbonate compositions of this invention are environmentally friendly, particularly as compared to chlorinated hydrocarbons and the like which are commonly used for removing grease. The compositions comprising carbonate and naphthene of this invention may advantageously be of low volatility and free of carcinogenic chemicals.

DETAILED DESCRIPTION OF THE INVENTION

The compositions of this invention contain a carbonate such as alkylene carbonate or dialkyl carbonate or both. The compositions may also include a dibasic ester and a monoester. In another embodiment, the compositions may include an alkyl-substituted cycloalkane.

The carbonates that may be employed in the practice of this invention include alkylene carbonates and dialkyl carbonates. The alkylene carbonate used in the present invention can contain from 2 to 10 carbon atoms. Representative examples of alkylene carbonates that may be employed in the practice of this invention include ethylene carbonate and propylene carbonate. Mixtures of carbonates may also be employed. In the practice of this invention, alkylene carbonates are preferred, and among the alkylene carbonates propylene carbonate is preferred. The dialkyl carbonate used in the present invention may contain from 3 to 25 carbon atoms. The dialkyl carbonate may be of formula R—$CO_3$—R', wherein R and R' may be the same or different, and may independently in each occurrence be alkyl of from 1 to about 12 carbon atoms. In one embodiment, the dialkyl carbonate may be dimethyl carbonate, diethyl carbonate, or a mixture thereof. The amount of alkylene carbonate, dialkyl carbonate or both used in the practice of this invention may vary widely. Typically the total amount of carbonate is from about 0.1 to about 90 percent by weight of the total composition. In one embodiment, the amount is from about 10 to about 50 percent by weight. In another embodiment, the amount is from about 15 to about 25 percent by weight.

For the paint stripping compositions, DBE may be employed. Typically, DBE is not used in degreasing applications, however. In general, the DBE used in this invention include aliphatic diesters having a molecular weight of up to about 200. DBE has the advantage of being considered to be safe and of low toxicity. More than one dibasic ester can be used in the present compositions. DBE is a well known material and is currently available commercially. In general, the DBE used in this invention may be described as being a $C_1$ to $C_6$ dialkyl ester of a $C_2$ to $C_{10}$ aliphatic di-acid, and particularly a $C_1$ to $C_4$ dialkyl ester of a $C_2$ to $C_6$ aliphatic di-acid. For example, the DBE used in the practice of this invention may be derived from various di-acids such as from adipic acid, glutaric acid and succinic acid.

The amount of DBE used in the practice of this invention may vary widely. In general, the amount of DBE may be from about 0.1 percent by weight to about 90 percent by weight, more typically in the range from about 5 to about 50 percent by weight. In one embodiment of this invention, the DBE is present in an amount in the range from 15 to about 45 percent by weight of the total composition, preferably from about 20 to about 45 percent.

The mono-esters that may employed in the practice of this invention may vary widely. The mono-esters that may be used in the practice of this invention typically contain up to about 20 carbons. The mono-esters may include other functional groups in the compound. For instance, the mono-esters may also include ether groups, such as methyl, propyl, or butyl ether groups. The mono-esters also include the alkyl acetates of oxo alcohols. Representative non-limiting examples of esters that may be employed in the practice of this invention include ethyl acetate, butyl acetate, ethyl-3-ethoxy-propionate, propylene glycol methyl ether acetate, propylene glycol butyl ether acetate, dipropylene glycol methyl ether acetate and dipropylene glycol butyl ether acetate. Likewise, cyclic esters such as butyrolactone may be employed in the practice of this invention. Preferred mono-esters include an ether group. Ethyl-3-ethoxy-propionate ("EEP") is a representative preferred mono-ester which is considered to be safe and of low toxicity. The amount of mono-ester used in the practice of this invention may vary widely. Typically the amount is from about 0.1 to about 90 percent by weight of the total composition. In one embodiment, the amount is from about 5 to about 50 percent, preferably from about 15 to about 45 percent, and more preferably from about 20 to about 40 percent.

The alkyl-substituted cyclo-alkanes employed in the degreasing compositions may include naphthenes. The naphthenes that may employed in the practice of this invention may vary widely. Generally, as used herein, naphthene refers to a cycloalkane that contains 5 to 9 carbon atoms per molecule. Representative, non-limiting examples of such cycloalkanes that may be used in the practice of this invention include cyclopentane, cyclohexane, methylcyclopentane, cycloheptane, 1,1-dimethylcyclopentane, 1,2-dimethylcyclopentane, 1,3-dimethylcyclopentane, ethylcyclopentane, n-propylcyclopentane, methylcyclohexane, 1,1-dimethylcyclohexane, 1,2-dimethylcyclohexane, 1,3- dimethylcyclohexane, ethylcyclohexane, cyclooctane, mixtures thereof, and the like. As used herein, the alkyl-substituted cyclo-alkanes may also be referred to as naphthenes or hydrogenated solvents. As used herein, "Naftsoly" refers to mixture of alkyl-substituted cyclo-alkanes that contain a high percentage of $C_9$, $C_{10}$, and $C_{11}$ saturated hydrocarbons.

The amount of alkyl-substituted cyclo-alkane used in the practice of this invention may vary widely. In general, the amount of alkyl-substituted cyclo-alkane may be from about 0.1 percent by weight to about 90 percent by weight, more typically in the range from about 5 to about 50 percent by weight. In one embodiment of this invention, the alkyl-substituted cyclo-alkane is present in an amount in the range from 15 to about 45 percent by weight of the total composition. In another embodiment, the amount of alkyl-substituted cyclo-alkane is in the range from about 20 to about 45 percent.

In one embodiment, the degreasing compositions may contain from about 0.1 to about 50 percent by weight of the carbonate, and from about 0.1 to about 20 percent by weight of the alkyl-substituted cyclo-alkane. In another embodiment, the degreasing compositions may contain from about 0.1 to about 50 percent by weight of the carbonate, from about 0.1 to about 50 percent by weight of the alkyl-substituted cyclo-alkane, and from about 0.1 to about 20 percent by weight of a compatibilizer such as a soy carbonate. For degreasing compositions containing a carbonate, an alkyl-substituted cyclo-alkane, and a compatibilizer, the compositions generally contain each component in an amount from about 0.1 to about 99 percent by weight based on the combined weight of the carbonate, the alkyl-substituted cyclo-alkane, and the compatibilizer. For these compositions, the compatibilizers may include, but are not limited to, glycol ethers, alkyl acetates of oxo alcohols such as the Exxate solvents available from Exxon Chemical Company, soy carbonates, alkyl lactates, and alkyl soyates. In these compositions, typically, the carbonate is present in an amount of from about 5 to 75 percent by weight based on the combined weight of the carbonate, the alkyl-substituted cycloalkane, and the compatibilizer, more typically from about 10 to about 50 percent by weight based on the combined weight of the carbonate, the alkyl-substituted cyclo-alkane, and the compatibilizer. Typically, the alkyl-substituted cyclo-alkane is present in an amount of from about 5 to about 75 percent by weight based on the combined weight of the carbonate, the alkyl-substituted cycloalkane, and the compatibilizer; more typically, from about 30 to about 70 percent by weight based on the combined weight of the carbonate, the alkyl-substituted cyclo-alkane, and the compatibilizer. If needed, the amount of compatibilizer employed is an amount effective to form a form a miscible solution between the alkyl-substituted cyclo-alkane and the carbonate. Typically, the amount of compatibilizer is from about 5 to about 75 percent by weight based on the combined weight of the carbonate, the alkyl-substituted cyclo-alkane, and the compatibilizer, and more typically from about 30 to about 70 percent by weight based on the combined weight of the carbonate, the alkyl-substituted cyclo-alkane, and the compatibilizer. In another embodiment, the amount of compatibilizer is in the range from about 35 to about 65 percent by weight based on the combined weight of the carbonate, the alkyl-substituted cyclo-alkane, and the compatibilizer.

A class of compatibilizer that may be used with a degreasing composition containing an alkyl-substituted cyclo-alkane and a carbonate is currently available commercially include what are believed to be mixtures of various isomers of alkyl acetates of oxo alcohols, including isohexyl, isoheptyl, isooctyl, isononyl, isodecyl or isotridecyl acetate sold by Exxon Chemical Company, respectively, as Exxate 600, Exxate 700, Exxate 800, Exxate 900, Exxate 1000, and Exxate 1300. It is our understanding that the isohexyl acetate mixture comprises about, by weight, 36–38% n-hexyl acetate, 18–20% 2-methyl-1-pentyl acetate, 22–24% 3-methyl-i-pentyl acetate and 16–18% 4-methyl-i-pentyl acetate as principal compounds. It is our understanding that Exxate 1000 isodecyl acetate mixture is a complex mixture of isomers and gas chromatographic analysis shows about 100 different isomers being present, none of which are greater than about 12% by weight of the mixture. It is our understanding that Exxate 1000 has a boiling point range of about 425 degrees F to 482 degree F (95% distilled).

Another class of compatibilizer that may be used with a degreasing composition containing an alkyl-substituted cyclo-alkane and a carbonate is the alkyl soyates, such as methyl soyate. An alkyl soyate is an alkyl ester derived from soybean oil. Soybean oil is a mixture of saturated and unsaturated acids such as palmitic, stearic, oleic, and linoleic acids. The alkyl soyate may be of formula R—COOR' where R is methyl (methyl soyate) or ethyl (ethyl soyate). Hence, the alkyl soyate is, for instance, the methyl or ethyl ester of R—COOH.

The lactates that may employed in the practice of this invention including the degreasing compositions may vary widely. The lactates that may be used in the practice of this invention typically contain up to about 20 carbons. The lactates used in the practice of this invention generally include esters of lactic acid, such as methyl lactate, ethyl lactate, propyl lactate, butyl lactate, isopropyl lactate, isobutyl lactate or the like, or mixtures thereof.

The amount of lactate used in the practice of this invention for the degreasing compositions may vary widely. Typically the total amount of lactate compound is from about 0.1 to about 50 percent by weight of the total composition. In one embodiment, the amount is from about 5 to about 40 percent by weight. In another embodiment, the amount is in the range from about 10 to about 30 percent by weight.

For the paint stripping compositions of this invention, the organic sulfur-containing compounds that may employed in the practice of this invention may vary widely. The organic sulfur-containing compounds that may be used in the practice of this invention typically contain up to about 20 carbons. The organic sulfur-containing compounds may include other functional groups in the compound. Representative examples of sulfur-containing compounds that may be employed in the practice of this invention include dimethylsulfoxide (DMSO) and sulfolane. DMSO, for instance, is considered to be safe and of low toxicity. The amount of organic sulfur-containing compound used in the practice of this invention may vary widely. Typically the total amount of organic sulfur-containing compound is from about 0.1 to about 50 percent by weight of the total composition. In one embodiment, the amount is from about 5 to about 40 percent by weight. In another embodiment, the amount is in the range from about 10 to about 30 percent by weight.

For the paint stripping compositions of this invention, the ketones that may be employed in the practice of this invention may vary widely. The ketones that may be used in the practice of this invention typically contain up to about 20 carbons and are typically aliphatic compounds. The ketones may include other functional groups in the compound.

Representative non-limiting examples of ketones that may be used in the practice of this invention include acetone, methyl ethyl ketone (MEK), 5-methyl-2-hexanone (MILAK), methyl isobutyl ketone and methyl isoamyl butone. The amount of ketone used in the practice of this invention may vary widely. Typically the total amount of ketone is from about 0.1 to about 50 percent by weight of the total composition. In one embodiment, the amount is from about 5 to about 20 percent by weight. In another embodiment, the amount is in the range from about 5 to about 15 percent by weight.

The glycol ethers that may employed in the practice of this invention for both the paint stripping and degreasing compositions may vary widely. The glycol ethers may be used as compatibilizers when using a composition containing a alkyl-substituted cyclo-alkane and a carbonate. The glycol ethers that may be used in the practice of this invention typically contain up to about 20 carbons. The glycol ethers may include other functional groups in the compound. Representative non-limiting examples of useful glycol ethers include glycol ethers such as propylene glycol methyl ether (PM), dipropylene glycol methyl ether (DPM), or dipropylene glycol n-butyl ether (DPNB), ethylene glycol butyl ether (EB) and dipropylene glycol butyl ether (DB). The amount of glycol ether used in the practice of this invention may vary widely. Typically the total amount of glycol ether is from about 0.1 to about 50 percent by weight of the total composition. In one embodiment, the amount is from about 5 to about 20 percent by weight. In another embodiment, the amount is in the range from about 5 to about 15 percent by weight.

The compositions of this invention may optionally include an alcohol for both the degreasing compositions and paint stripping compositions of this invention. Representative examples of such alcohols include methanol, ethanol, propanol, butanol, and benzyl alcohol. In the practice of this invention, benzyl alcohol is preferred. Generally, if alcohol is present, compositions of this invention contain from 0 to about 90 percent by weight alcohol.

In certain embodiments of this invention with respect to the stripping compositions, the compositions contain from about 10 to about 50 percent by weight of the carbonate, from about 15 to about 45 percent by weight of DBE, and from about 15 to about 45 percent of the mono-ester, with the percentages totaling 100.

In addition to the components described above, it is contemplated that the paint stripping compositions of this invention may optionally contain activators such as formic or oxalic acid, thickeners, surfactants, acids or bases, stabilizers, corrosion inhibitors, and other additives commonly used in paint removers.

Non-limiting examples of representative thickeners include cellulose ethers such hydroxypropyl cellulose, ethyl cellulose, ethyl hydroxyethyl cellulose, methyl cellulose, and other alkyl or hydroxy alkyl cellulose; silica including colloidal silica; clays such as bentonite and montmorillonite starch; alumina including colloidal alumina; gum arabic; tragacanth; agar; sugar derivatives; high molecular weight polyethylene oxides; guar gum; xanthan gum; polyvinyl pyrrolidone and methyl vinyl ether/maleic anhydride copolymers. It has been found that certain hydroxy alkyl cellulose ethers and certain experimental polymers are particularly effective and resistant to breakdown in the practice of this invention. Such cellulose ethers are available commercially from The Dow Chemical Company under the trade names Methocel® F4MPRG and Methocel® 311.

When a thickener is used, the amount of such thickener can vary depending on the desired level of thickening for the given application. In general, the amount of thickener employed is about I to about 4 percent by weight.

Non-limiting examples of representative corrosion inhibitors include ethoxylated butynediol, petroleum sulfonates, blends of propargyl alcohol and thiourea. If used, the amount of such corrosion inhibitors is typically up to about 10% by weight of the total composition.

Non-limiting examples of representative surfactants which may optionally be used in the practice of this invention include non-ionic, anionic, cationic and amphoteric surfactants, such as monocarboxyl cocoimidoazoline, higher alkyl sulfate sodium salts, tridecyloxy poly(alkyleneoxy ethanol), ethoxylated or propoxylated alkyl phenol, alkyl sulfoamides, $C_{10-18}$ alkaryl sulfonates such as alkylbenzene sulfonates, cocoamphaodipropionate, cetylpalmitic alkanol amides, hydrogenated castor oil, isooctylphenyl polyethoxy ethanol, sorbitan monopalmitate, $C_{8-1}$ alkyl pyrrolidone, cocoaminoprpionic acid and polyethoxy amino salts thereof. When used, the amount of surfactant should be sufficient to render the composition miscible. If used, the amount of surfactant is typically from about 0.1 to about 10 percent by weight of the total composition.

The degreasing and paint stripping compositions of this invention may also optionally contain a wide variety of other organic cosolvents. Likewise, the present invention may be practiced in the absence of one or more of such solvents. Non-limiting examples of representative classes of such other cosolvents include hydrocarbons (apart from the alkl-substituted cyclo-alkanes for the degreasing compositions), ethers, phenols, glycols, lactones, chlorinated hydrocarbons, aromatic hydrocarbons, nitrated hydrocarbons, and amides. Such cosolvents may be polar or non-polar, may be protic or aprotic, may be cyclic, branched, or straight-chain, and may contain one or more functional groups. Representative examples of common hydrocarbon solvents include hexane, toluene, xylene, and mixtures of aliphatic and aromatic hydrocarbons. Representative examples of common ether solvents include dibutyl ether, ethyl ether, and diphenyl ether. Representative examples of common phenols include phenol and the cresols and resorinols. Representative examples of common glycol solvents include ethylene, propylene and butylene glycols as well as methyl propane diol. Representative examples of common chlorinated hydrocarbon solvents include methylene chloride, methyl chloroform, chlorobenzenes and dichlorobenzenes. Representative examples of common nitrated hydrocarbon solvents include nitroethane and nitropropane. Representative examples of common amide solvents include formamide, dimethyl formamide, acetamide, and dimethylacetamide.

When a given composition containing a given carbonate does not form a miscible composition, a co-solvent may be used to provide a miscible composition. For instance, a glycol ether may be added as a co-solvent in an amount effective to solubilize the components of the mixture. Such glycol ethers may be included for other purposes as well. Such amounts may vary depending on the specific composition of interest, as one of skill in the art may appreciate. The particular type and amount of glycol ether which will afford a miscible composition may be identified by routine experimentation. Also, an alcohol or alkylene carbonate may be beneficially employed as a co-solvent to provide miscible dialkyl carbonate compositions of this invention.

With respect to the paint stripping process of this invention, the conditions under which the process may be practiced vary widely. Typically, the process will be conducted under ambient atmospheric conditions. Temperatures from 0° F. to about 125° F., although higher temperatures may be used. The paint remover composition may be applied by any convenient method such as by dipping, spraying, or brushing the composition onto the paint surface. For resistant painted surfaces it may be desirable to apply the composition two or more times to fully separate the paint from the surface. It may be desirable to use a rag, scraper, sand blaster, or the like to fully remove paint chips from the surface after the paint remover composition has been given time to fully act. Alternatively, high pressure water spray may be employed to remove paint chips and residual paint remover composition. It may be appreciated that the time required for the paint remover composition to act will vary due to a variety of factors such as temperature, paint type, and particular paint remover formulation being used. In general, application times are between one minute and one hour, although longer application times may be used.

The following examples are illustrative of this invention and are not intended to be limit the scope of the invention or claims hereto. Unless otherwise denoted all percentages are by weight. In the tables, "N/A" denotes "not available;" "PC" denotes propylene carbonate; "BC" denotes butylene carbonate, EC-50 denotes a 50/50 blend of propylene carbonate and ethylene carbonate. The subscripts in the tables denote the following: "a" refers to a solution composed of 70% PC and 30% Vikoflex 7010 Carbonate, a soy carbonate, "b" is a solution composed of 70% PC and 30% BC (butylene carbonate).

EXAMPLE 1

Sample compositions A-F were prepared by combining them in a container with stirring. The percentages of respective components of Samples A-F are shown in Table 1.

TABLE 1

| Sample | PC % | EC-50 % | DMSO % | DBE % | EEP % | DPM % | MIAK % | Thickener % |
|--------|------|---------|--------|-------|-------|-------|--------|-------------|
| A | 19.5 | 0 | 0 | 40.5 | 40 | 0 | 0 | 0 |
| B | 0 | 19.5 | 0 | 40.5 | 40 | 0 | 0 | 0 |
| C | 19.5 | 0 | 22.5 | 34.5 | 23.5 | 0 | 0 | 0 |
| D | 19.5 | 0 | 20.5 | 20.5 | 20 | 10.5 | 9 | 0 |
| E | 19 | 0 | 22 | 34 | 23 | 0 | 0 | 2 |
| F | 19 | 0 | 20 | 20 | 20 | 10 | 9 | 2 |

Samples A-F were then tested in several experiments for their efficacy in paint stripping applications. The results are shown in Table 2. In Table 2, the results are in minutes.

The compositions were applied to panels which were painted with primer and two to three coats of the described paint. The panels were aged for 1.5 to 2 years before being used in the tests.

TABLE 2

| Sample | Test 1 Varnished hardwood | Test 2 Latex on wood | Test 3 Latex enamel on wood | Test 4 Acrylic enamel on metal | Test 5 Latex enamel on metal | Test 6 Acrylic lacquer primer and finish |
|--------|---------------------------|----------------------|-----------------------------|--------------------------------|------------------------------|------------------------------------------|
| A | 11.93 | 1.08 | 1.75 | 1.53 | 2.47 | 13.13 |
| B | 9.3 | 2.58 | 0.87 | 2.77 | 5.77 | 14.63 |
| C | 4.72 | 2.53 | 2.22 | 4.9 | 3.05 | 7.28 |
| D | 7.03 | 2.15 | 2.67 | 5.52 | 4.83 | 12.3 |
| E | 2.9 | 2.98 | 2.43 | 4.68 | 2.98 | 10.58 |
| F | 2.8 | 2.75 | 2.75 | 1.2 | 1.53 | 11.1 |

The data in Table 2 shows that the amount of time in minutes the formulations required to remove the coating. These rapid stripping times are analogous to times required for methylene chloride based paint strippers to remove the same coatings. These formulations perform as well as the more dangerous methylene chloride and NMP based formulations but are much safer and environmentally friendly.

EXAMPLE 2

Decreasing Composition

Compositions comprising a carbonate and naphthene were examined for efficacy for removal of a grease from a substrate. The grease used in Table 3 was NEVER SIEZE grease (#5). The compositions were applied to the amounts stated in Table 3 and allowed to sit for thirty minutes. The amount of grease remaining after the treatment with the composition is also provided in Table 3.

TABLE 3

GREASE REMOVAL

| Run Number | Carbonate (amount in grams) | Co-solvent #1 (amount in grams) | Co-solvent #2 (amount in grams) | Amount of Grease to be Treated (mL) | Amount of Grease Remaining After Treatment (mL) |
|---|---|---|---|---|---|
| 3-1 | PC (25) | DPnB (51) | Napthene (24) | 26 | 6 |
| 3-2 | PC (25) | DPnB (52.5) | Naftosolv (22.5) | 30 | 28 |
| 3-3 | PC (25) | DPnB (25) | Methyl soyate (50) | 28 | 24 |
| 3-4 | PC (25) | DB (46) | Naphthene (29) | 26 | 14 |
| 3-5 | PC (25) | DB (49) | Naftosolv (26) | 24 | 8 |
| 3-6 | PC (25) | DB (25) | Methyl Soyate (50) | 23 | 22 |
| 3-7 | PC (25) | PB (50) | Naphthene (25) | 26 | 22 |
| 3-8 | PC (25) | PB (50) | Naftosolv (25) | 25 | 10 |
| 3-9 | PC (25) | Exxate 900 (60) | Naphthene (15) | 22 | 1 |
| 3-10 | PC (25) | Exxate 900 (60) | Naftosolv (15) | 25 | 1 |
| 3-11 | PC (25) | Exxate 900 (40) | Methyl Soyate (35) | 24 | 22 |
| 3-12 | PC (25) | Ethyl lactate (62) | Naphthene (13) | 22 | 19 |
| 3-13 | PC (25) | Ethyl lactate (64) | Naftosolv (11) | 26 | 26 |
| 3-14 | PC (25) | Ethyl lactate (25) | Methyl Soyate (50) | 14 | 14 |
| 3-15 | PC/Vikoflex[a] (25) | DPnB (43) | Naphthene (32) | 24 | 11 |
| 3-16 | PC/Vikoflex[a] (25) | DPnB (43) | Naftoslov (32) | 26 | 16 |
| 3-17 | PC/Vikoflex[a] (25) | DB (39) | Naphthene (36) | 31 | 4 |
| 3-18 | PC/Vikoflex[a] (25) | DB (41) | Naftoslov (34) | 27 | 1 |
| 3-19 | PC/Vikoflex[a] (25) | PB (40) | Naphthene (35) | 26 | 1 |
| 3-20 | PC/Vikoflex[a] (25) | PB (42) | Naftosolv (34) | 30 | 2 |
| 3-21 | PC/Vikoflex[a] (25) | Exxate 900 (50) | Naphthene (25) | 33 | 1 |
| 3-22 | PC/Vikoflex[a] (25) | Exxate 900 (50) | Naftosolv (25) | 21 | 2 |
| 3-23 | PC/Vikoflex (25) | Ethyl lactate (56) | Naphthene (19) | 5 | 2 |
| 3-24 | PC/Vikoflex[a] (25) | Ethyl lactate (60) | Naftosolv (15) | 23 | 11 |
| 3-25 | PC/BC[b] (25) | DPnB (47) | Naphthene (28) | 27 | 1 |
| 3-26 | PC/BC[b] (25) | DPnB (48) | Naftosolv (27) | 23 | 1 |
| 3-27 | PC/BC[b] (25) | DB (61) | Naphthene (14) | 22 | 4 |
| 3-28 | PC/BC[b] (25) | DB (45) | Naphthene (20) | 31 | 3 |
| 3-29 | PC/BC[b] (25) | DB (68) | Naftosolv (7) | 22 | 20 |
| 3-30 | PC/BC[b] (25) | DB (45) | Naftosolv (20) | 22 | 20 |
| 3-31 | PC/BC[b] (25) | PB (44) | Naphthene (31) | 10 | 1 |
| 3-32 | PC/BC[b] (25) | PB (46) | Naftosolv (29) | 24 | 22 |
| 3-33 | PC/BC[b] (25) | Exxate 900 (54) | Naphthene (21) | 22 | 3 |
| 3-34 | PC/BC[b] (25) | Exxate 900 (53) | Naftosolv (22) | 20 | 1 |
| 3-35 | PC/BC[b] (25) | Ethyl lactate (65) | Naphthene (10) | 20 | 18 |
| 3-36 | PC/BC[b] (25) | Ethyl lactate (65) | Naftosolv (10) | 26 | 24 |

TABLE 4

REMOVAL OF GULF EP1 GREASE

| Run Number | Carbonate (amount in grams) | Co-solvent #1 (amount in grams) | Co-solvent #2 (amount in grams) | Amount of Grease to be Treated (mL) | Amount of Grease Remaining After Treatment (mL) |
|---|---|---|---|---|---|
| 4-1 | PC (25) | DPnB (51) | Napthene (24) | 32 | 26 |
| 4-2 | PC (25) | DPnB (52.5) | Naftosolv (22.5) | 35 | 35 |
| 4-3 | PC (25) | DPnB (25) | Methyl soyate (50) | 29 | 24 |
| 4-4 | PC (25) | DB (46) | Naphthene (29) | 35 | 35 |
| 4-5 | PC (25) | DB (49) | Naftosolv (26) | 30 | 28 |
| 4-6 | PC (25) | DB (25) | Methyl Soyate (50) | 28 | 27 |
| 4-7 | PC (25) | PB (50) | Naphthene (25) | 34 | 34 |
| 4-8 | PC (25) | PB (50) | Naftosolv (25) | 30 | 30 |
| 4-9 | PC (25) | Exxate 900 (60) | Naphthene (15) | 38 | 24 |
| 4-10 | PC (25) | Exxate 900 (60) | Naftosolv (15) | 33 | 32 |
| 4-11 | PC (25) | Exxate 900 (40) | Methyl Soyate (35) | 42 | 42 |
| 4-12 | PC (25) | Ethyl lactate (62) | Naphthene (13) | 45 | 40 |
| 4-13 | PC (25) | Ethyl lactate (64) | Naftosolv (11) | 46 | 35 |
| 4-14 | PC (25) | Ethyl lactate (25) | Methyl Soyate (50) | 35 | 33 |
| 4-15 | PC/Vikoflex[a] (25) | DPnB (43) | Naphthene (32) | 33 | 30 |
| 4-16 | PC/Vikoflex[a] (25) | DPnB (43) | Naftoslov (32) | 55 | 53 |
| 4-17 | PC/Vikoflex[a] (25) | DB (39) | Naphthene (36) | 53 | 52 |
| 4-18 | PC/Vikoflex[a] (25) | DB (41) | Naftoslov (34) | 28 | 20 |
| 4-19 | PC/Vikoflex[a] (25) | PB (40) | Naphthene (35) | 34 | 32 |

TABLE 4-continued

REMOVAL OF GULF EP1 GREASE

| Run Number | Carbonate (amount in grams) | Co-solvent #1 (amount in grams) | Co-solvent #2 (amount in grams) | Amount of Grease to be Treated (mL) | Amount of Grease Remaining After Treatment (mL) |
|---|---|---|---|---|---|
| 4-20 | PC/Vikoflex[a] (25) | PB (42) | Naftosolv (34) | 45 | 40 |
| 4-21 | PC/Vikoflex[a] (25) | Exxate 900 (50) | Naphthene (25) | 32 | 28 |
| 4-22 | PC/Vikoflex[a] (25) | Exxate 900 (50) | Naftosolv (25) | 30 | 30 |
| 4-23 | PC/Vikoflex (25) | Ethyl lactate (56) | Naphthene (19) | 26 | 24 |
| 4-24 | PC/Vikoflex[a] (25) | Ethyl lactate (60) | Naftosolv (15) | 32 | 32 |
| 4-25 | PC/BC[b] (25) | DPnB (47) | Naphthene (28) | 35 | 33 |
| 4-26 | PC/BC[b] (25) | DPnB (48) | Naftosolv (27) | 46 | 45 |
| 4-27 | PC/BC[b] (25) | DB (61) | Naphthene (14) | 24 | 23 |
| 4-28 | PC/BC[b] (25) | DB (45) | Naphthene (20) | 35 | 35 |
| 4-29 | PC/BC[b] (25) | DB (68) | Naftosolv (7) | 32 | 30 |
| 4-30 | PC/BC[b] (25) | DB (45) | Naftosolv (20) | 50 | 42 |
| 4-31 | PC/BC[b] (25) | PB (44) | Naphthene (31) | 23 | 5 |
| 4-32 | PC/BC[b] (25) | PB (46) | Naftosolv (29) | 49 | 26 |
| 4-33 | PC/BC[b] (25) | Exxate 900 (54) | Naphthene (21) | 46 | 26 |
| 4-34 | PC/BC[b] (25) | Exxate 900 (53) | Naftosolv (22) | 28 | 12 |
| 4-35 | PC/BC[b] (25) | Ethyl lactate (65) | Naphthene (10) | 62 | 34 |
| 4-36 | PC/BC[b] (25) | Ethyl lactate (65) | Naftosolv (10) | 64 | 51 |

In Table 4, methyl soyate is employed. Methyl soyate is a methyl ester derived from soybean oil.

TABLE 5

REMOVAL OF GULF EP2 GREASE

| Run Number | Carbonate (amount in grams) | Co-solvent #1 (amount in grams) | Co-solvent #2 (amount in grams) | Amount of Grease to be Treated (mL) | Amount of Grease Remaining After Treatment (mL) |
|---|---|---|---|---|---|
| 5-1 | PC (25) | DPnB (51) | Napthene (24) | 24 | 24 |
| 5-2 | PC (25) | DPnB (52.5) | Naftosolv (22.5) | 25 | 23 |
| 5-3 | PC (25) | DPnB (25) | Methyl soyate (50) | 22 | 18 |
| 5-4 | PC (25) | DB (46) | Naphthene (29) | 30 | 28 |
| 5-5 | PC (25) | DB (49) | Naftosolv (26) | 22 | 20 |
| 5-6 | PC (25) | DB (25) | Methyl Soyate (50) | 20 | 15 |
| 5-7 | PC (25) | PB (50) | Naphthene (25) | 22 | 18 |
| 5-8 | PC (25) | PB (50) | Naftosolv (25) | 23 | 22 |
| 5-9 | PC (25) | Exxate 900 (60) | Naphthene (15) | 24 | 10 |
| 5-10 | PC (25) | Exxate 900 (60) | Naftosolv (15) | 28 | 12 |
| 5-11 | PC (25) | Exxate 900 (40) | Methyl Soyate (35) | 28 | 24 |
| 5-12 | PC (25) | Ethyl lactate (62) | Naphthene (13) | 26 | 24 |
| 5-13 | PC (25) | Ethyl lactate (64) | Naftosolv (11) | 20 | 18 |
| 5-14 | PC (25) | Ethyl lactate (25) | Methyl Soyate (50) | 12 | 12 |
| 5-15 | PC/Vikoflex[a] (25) | DPnB (43) | Naphthene (32) | 18 | 2 |
| 5-16 | PC/Vikoflex[a] (25) | DPnB (43) | Naftoslov (32) | 26 | 24 |
| 5-17 | PC/Vikoflex[a] (25) | DB (39) | Naphthene (36) | 28 | 26 |
| 5-18 | PC/Vikoflex[a] (25) | DB (41) | Naftoslov (34) | 18 | 1 |
| 5-19 | PC/Vikoflex[a] (25) | PB (40) | Naphthene (35) | 16 | 2 |
| 5-20 | PC/Vikoflex[a] (25) | PB (42) | Naftosolv (34) | 28 | 24 |
| 5-21 | PC/Vikoflex[a] (25) | Exxate 900 (50) | Naphthene (25) | 22 | 18 |
| 5-22 | PC/Vikoflex[a] (25) | Exxate 900 (50) | Naftosolv (25) | 22 | 15 |
| 5-23 | PC/Vikoflex (25) | Ethyl lactate (56) | Naphthene (19) | 10 | 4 |
| 5-24 | PC/Vikoflex[a] (25) | Ethyl lactate (60) | Naftosolv (15) | 14 | 14 |
| 5-25 | PC/BC[b] (25) | DPnB (47) | Naphthene (28) | 26 | 22 |
| 5-26 | PC/BC[b] (25) | DPnB (48) | Naftosolv (27) | 24 | 20 |
| 5-27 | PC/BC[b] (25) | DB (61) | Naphthene (14) | 9 | 9 |
| 5-28 | PC/BC[b] (25) | DB (45) | Naphthene (20) | 20 | 17 |
| 5-29 | PC/BC[b] (25) | DB (68) | Naftosolv (7) | 22 | 20 |
| 5-30 | PC/BC[b] (25) | DB (45) | Naftosolv (20) | 22 | 20 |
| 5-31 | PC/BC[b] (25) | PB (44) | Naphthene (31) | 10 | 1 |
| 5-32 | PC/BC[b] (25) | PB (46) | Naftosolv (29) | 24 | 22 |
| 5-33 | PC/BC[b] (25) | Exxate 900 (54) | Naphthene (21) | 22 | 3 |
| 5-34 | PC/BC[b] (25) | Exxate 900 (53) | Naftosolv (22) | 20 | 1 |
| 5-35 | PC/BC[b] (25) | Ethyl lactate (65) | Naphthene (10) | 20 | 18 |
| 5-36 | PC/BC[b] (25) | Ethyl lactate (65) | Naftosolv (10) | 26 | 24 |

A review of the data in Tables 3, 4, and 5 shows that the compositions of runs 6, 9, 10, 18, 19, 31, 33, and 34 had the best overall results.

A number of additional compositions were tested on several different greases. The greases employed may be described as follows.

Chevron FM Grease EP NLGI 2, an H1 lubricant, multi-purpose, typically used for food processing,
Chevron Ultra-Duty Grease EP NLGI 2, a high load carrying capacity, water resistant grease used commonly for industrial purposes,
Dow Corning BR2-Plus, a multi-purpose, E. P. grease,
Chevron Dura-Lith Grease EP NLGI2, an extreme pressure, multi-purpose industrial grease,
Chevron SRI Grease, NLGI2, a ball and roller bearing grease used for industrial purposes,
Chevron Moly Grease EP, NLGI2, a rust and oxidation inhibited, multi-purpose, industrial grease.

The degreasing compositions used are shown in Table 6.

TABLE 8

| | Dow Corning BR2 | | | Exxon Ronex MP | | |
|---|---|---|---|---|---|---|
| Composition | mil. before | mil. after | % dif. | mil. before | mil. after | % dif. |
| 37 | 35 | 3 | 91.43 | 32 | 5 | 84 |
| 38 | 40 | 1 | 97.5 | 40 | 5 | 87.50 |
| 39 | 32 | 1 | 96.88 | 26 | 4 | 84.62 |
| 40 | 40 | 1 | 97.5 | 35 | 5 | 85.71 |
| 41 | 30 | 0 | 100.00 | 30 | 0 | 100.00 |
| 42 | 26 | 1 | 96.15 | 28 | 1 | 96.43 |
| 43 | 32 | 1 | 96.88 | 36 | 5 | 86.11 |
| 44 | 34 | 0 | 100.00 | 40 | 2 | 95.00 |
| 45 | 26 | 0 | 100.00 | 33 | 1 | 96.97 |
| 46 | 24 | 0 | 100.00 | 28 | 0 | 100.00 |
| 47 | 33 | 1 | 96.97 | 35 | 4 | 88.57 |
| 48 | 32 | 2 | 93.75 | 34 | 3 | 91.18 |
| 49 | 26 | 0 | 100.00 | 32 | 2 | 93.75 |

TABLE 6

| Composition No. | PC/Vikoflex[a] | 50% PC, 50% BC | 70% PC, 30% BC | Exxate 900 | DB | PB | Naphthene | Naftosolv |
|---|---|---|---|---|---|---|---|---|
| 37 | 200 | 0 | 0 | 0 | 328 | 0 | 0 | 272 |
| 38 | 104 | 0 | 0 | 0 | 296 | 0 | 0 | 400 |
| 39 | 296 | 0 | 0 | 0 | 304 | 0 | 0 | 200 |
| 40 | 200 | 0 | 0 | 0 | 0 | 322 | 280 | 0 |
| 41 | 104 | 0 | 0 | 0 | 0 | 303 | 400 | 0 |
| 42 | 288 | 0 | 0 | 0 | 0 | 296 | 216 | 0 |
| 43 | 0 | 0 | 200 | 0 | 0 | 361 | 248 | 0 |
| 44 | 0 | 0 | 96 | 0 | 0 | 327 | 400 | 0 |
| 45 | 0 | 0 | 304 | 0 | 0 | 325 | 184 | 0 |
| 46 | 0 | 0 | 200 | 432 | 0 | 0 | 166 | 0 |
| 47 | 0 | 0 | 104 | 480 | 0 | 0 | 216 | 0 |
| 48 | 0 | 0 | 287 | 329 | 0 | 0 | 119 | 0 |
| 49 | 0 | 218.4 | 0 | 0 | 0 | 273.5 | 0 | 0 |

Compositions 37–49 were employed as degreasing compositions with a variety of greases according to the procedures of Example 2 after 1 hour of time. The data is reported in Tables 7 to 9.

TABLE 7

| | Chevron Moly EP | | | Chevron FM EP | | | Chevron Ultra Duty | | |
|---|---|---|---|---|---|---|---|---|---|
| Composition | mil. before | mil. after | % dif. | mil. before | mil. after | % dif. | mil. before | mil. after | % dif. |
| 37 | 26 | 2 | 92.31 | 26 | 6 | 76.92 | 30 | 3 | 90.00 |
| 38 | 35 | 1 | 97.14 | 32 | 3 | 90.63 | 35 | 25 | 26.57 |
| 39 | 36 | 2 | 94.44 | 35 | 15 | 57.14 | 26 | 1 | 96.43 |
| 40 | 34 | 1 | 97.06 | 26 | 3 | 89.29 | 32 | 3 | 90.63 |
| 41 | 22 | 0 | 100.00 | 22 | 0 | 100.00 | 28 | 1 | 96.43 |
| 42 | 34 | 1 | 97.06 | 32 | 2 | 93.75 | 26 | 1 | 96.43 |
| 43 | 24 | 0 | 100.00 | 24 | 2 | 91.67 | 32 | 5 | 84.38 |
| 44 | 35 | 1 | 97.14 | 32 | 1 | 96.88 | 32 | 1 | 96.88 |
| 45 | 40 | 1 | 97.50 | 35 | 10 | 71.43 | 30 | 3 | 90.00 |
| 46 | 34 | 1 | 97.06 | 33 | 1 | 96.97 | 26 | 1 | 96.43 |
| 47 | 36 | 3 | 91.67 | 34 | 6 | 82.35 | 32 | 6 | 81.25 |
| 48 | 30 | 2 | 93.33 | 26 | 0 | 100.00 | 30 | 3 | 90.00 |
| 49 | 35 | 1 | 97.14 | 32 | 5 | 84.38 | 28 | 1 | 96.43 |

TABLE 9

| Composition | Chevron Dura Lith | | | Chevron SRI | | |
|---|---|---|---|---|---|---|
| | mil. before | mil. after | % dif. | mil. before | mil. after | % dif. |
| 37 | 35 | 0 | 100.00 | 26 | 1 | 96.15 |
| 38 | 40 | 0 | 100.00 | 32 | 2 | 93.75 |
| 39 | 32 | 1 | 96.88 | 35 | 4 | 88.57 |
| 40 | 35 | 1 | 97.14 | 26 | 2 | 92.31 |
| 41 | 30 | 1 | 96.67 | 22 | 0 | 100.00 |
| 42 | 30 | 0 | 100.00 | 26 | 2 | 92.66 |
| 43 | 32 | 2 | 93.75 | 18 | 3 | 83.33 |
| 44 | 31 | 0 | 100.00 | 322 | 4 | 87.50 |
| 45 | 30 | 0 | 100.00 | 35 | 6 | 82.85 |
| 46 | 28 | 0 | 100.00 | 35 | 0 | 100.00 |
| 47 | 32 | 1 | 96.88 | 36 | 10 | 73.66 |
| 48 | 33 | 0 | 100.00 | 26 | 0 | 100.00 |
| 49 | 32 | 0 | 100.00 | 35 | 5 | 85.71 |

The average percentage of grease removal of each of the degreasing compositions for Tables 7–9 was as follows:

| composition | average percentage |
|---|---|
| 37 | 90.17 |
| 38 | 85.01 |
| 39 | 87.85 |
| 40 | 92.80 |
| 41 | 99.01 |
| 42 | 96.10 |
| 43 | 90.87 |
| 44 | 96.20 |
| 45 | 91.25 |
| 46 | 96.64 |
| 47 | 87.34 |
| 48 | 95.47 |
| 49 | 93.92 |

Compositions 50–60 were employed as degreasing compositions with a variety of greases according to the procedures of Example 2 after 1 hour of time. The data is reported in Tables 11 to 13.

TABLE 10

| Composition | PC | PC/ Vikoflex[a] | 70% PC, 30% BC | EL | DB | Exxate 900 | PB | Naphthelene | Naftosolv | Methyl soyate |
|---|---|---|---|---|---|---|---|---|---|---|
| 50 | 25 | 0 | 0 | 0 | 25 | 0 | 0 | 0 | 0 | 50 |
| 51 | 25 | 0 | 0 | 0 | 0 | 60 | 0 | 15 | 0 | 0 |
| 52 | 25 | 0 | 0 | 0 | 0 | 60 | 0 | 0 | 15 | 0 |
| 53 | 0 | 25 | 0 | 0 | 41 | 0 | 0 | 0 | 34 | 0 |
| 54 | 0 | 25 | 0 | 0 | 0 | 0 | 40 | 35 | 0 | 0 |
| 55 | 0 | 0 | 25 | 0 | 0 | 0 | 44 | 31 | 0 | 0 |
| 56 | 0 | 0 | 25 | 0 | 0 | 54 | 0 | 21 | 0 | 0 |
| 57 | 0 | 0 | 25 | 0 | 0 | 53 | 0 | 0 | 22 | 0 |
| 58 | 50 | 0 | 0 | 50 | 0 | 0 | 0 | 0 | 0 | 0 |
| 59 | 100 | 0 | 0 | 0 | 0 | 0 | 0 | 0 | 0 | 0 |
| 60 | 0 | 0 | 0 | 100 | 0 | 0 | 0 | 0 | 0 | 0 |

Compositions 50–60 were employed as degreasing compositions with a variety of grasses according to the procedures of Example 2 after 1 hour of time. The data is reported in Tables 11 to 13.

TABLE 11

| Composition | Chevron Moly EP | | | Chevron FM EP | | | Chevron Ultra Duty | | |
|---|---|---|---|---|---|---|---|---|---|
| | mil. before | mil. after | % dif. | mil. before | mil. after | % dif. | mil. before | mil. after | % dif. |
| 50 | 30 | 30 | 0.00 | 22 | 20 | 9.09 | 24 | 24 | 0.00 |
| 51 | 32 | 0 | 100.00 | 12 | 1 | 91.67 | 20 | 0 | 100.00 |
| 52 | 28 | 0 | 100.00 | 32 | 1 | 96.88 | 40 | 38 | 5.00 |
| 53 | 30 | 0 | 100.00 | 30 | 15 | 50.00 | 32 | 0 | 100.00 |
| 54 | 26 | 0 | 100.00 | 24 | 4 | 83.33 | 28 | 0 | 100.00 |
| 55 | 26 | 0 | 100.00 | 26 | 3 | 88.46 | 28 | 0 | 100.00 |
| 56 | 32 | 0 | 100.00 | 16 | 1 | 93.75 | 22 | 0 | 100.00 |
| 57 | 30 | 0 | 100.00 | 32 | 1 | 96.88 | 32 | 15 | 53.13 |
| 58 | 22 | 20 | 9.09 | 34 | 32 | 5.88 | 32 | 32 | 0.00 |
| 59 | 24 | 24 | 0.00 | 28 | 28 | 0.00 | 28 | 28 | 0.00 |
| 60 | 24 | 24 | 0.00 | 30 | 30 | 0.00 | 35 | 35 | 0.00 |

TABLE 12

| Composition | Texaco Novalex EP2 | | | Dow Corning BR2 | | |
|---|---|---|---|---|---|---|
| | mil. before | mil. after | % dif. | mil. before | mil. after | % dif. |
| 50 | 28 | 24 | 14.29 | 28 | 28 | 0.00 |
| 51 | 32 | 30 | 6.25 | 40 | 35 | 15.50 |
| 52 | 22 | 1 | 95.45 | 32 | 2 | 93.75 |
| 53 | 26 | 1 | 95.15 | 32 | 0 | 100.00 |
| 54 | 24 | 1 | 95.83 | 28 | 0 | 100.00 |
| 55 | 20 | 0 | 100.00 | 28 | 0 | 100.00 |
| 56 | 28 | 1 | 96.43 | 30 | 5 | 83.33 |
| 57 | 26 | 2 | 92.31 | 35 | 10 | 71.43 |
| 58 | 22 | 20 | 9.09 | 30 | 30 | 0.00 |
| 59 | 28 | 26 | 7.14 | 38 | 38 | 0.00 |
| 60 | 26 | 26 | 0.00 | 35 | 35 | 0.00 |

TABLE 13

| Composition | Chevron Dura Lith | | | Chevron SRI | | |
|---|---|---|---|---|---|---|
| | mil. before | mil. after | % dif. | mil. before | mil. after | % dif. |
| 50 | 24 | 24 | 0.00 | 30 | 26 | 13.33 |
| 51 | 22 | 0 | 100.00 | 26 | 0 | 100.00 |
| 52 | 35 | 32 | 8.57 | 45 | 0 | 100.00 |
| 53 | 32 | 0 | 100 | 40 | 5 | 87.5 |
| 54 | 30 | 0 | 100.00 | 32 | 2 | 93.75 |
| 55 | 30 | 0 | 100.00 | 40 | 5 | 87.50 |
| 56 | 24 | 0 | 100.00 | 26 | 0 | 100.00 |
| 57. | 10 | 2 | 95.00 | 40 | 0 | 100.00 |
| 58 | 35 | 34 | 2.86 | 45 | 42 | 6.67 |
| 59 | 32 | 30 | 6.25 | 40 | 38 | 5.00 |
| 60 | 30 | 30 | 0.00 | 35 | 34 | 2.86 |

The average percentage of grease removal of each of the degreasing compositions for Tables 11–13 was as follows:

| composition | average percentage |
|---|---|
| 50 | 5.24 |
| 51 | 72.92 |
| 52 | 71.38 |
| 53 | 90.52 |
| 54 | 96.13 |
| 55 | 96.57 |
| 56 | 96.22 |
| 57 | 86.96 |
| 58 | 4.80 |
| 59 | 2.63 |
| 60 | 0.41 |

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as illustrative embodiments. Equivalent elements or materials may be substituted for those illustrated and described herein, and certain features of the invention may be utilized independently of the use of other features, all as would be apparent to one skilled in the art after having the benefit of this description of the invention.

What is claimed is:

1. A composition useful as a degreaser, comprising: a carbonate and a alkyl-substituted cyclo-alkane, wherein the carbonate is an alkylene carbonate, a dialkyl carbonate, or a combination thereof.

2. The composition of claim 1, wherein the carbonate is an alkylene carbonate containing from 2 to 10 carbon atoms.

3. The composition of claim 1, wherein the carbonate is propylene carbonate or ethylene carbonate or both.

4. The composition of claim 1, the carbonate is ethylene carbonate or wherein propylene carbonate.

5. The composition of claim 1, further comprising a glycol ether.

6. The composition of claim 1, further comprising a glycol ether having up to 20 carbon atoms.

7. The composition of claim 1, further comprising a mono-ester.

8. The composition of claim 7, wherein the mono-ester include an ether group.

9. The composition of claim 1, further comprising a soy carbonate.

10. The composition of claim 1, further comprising an alkyl lactate.

11. The composition of claim 10, wherein the alkyl lactate is ethyl lactate.

12. The composition of claim 1, wherein the mono-ester is a alkyl acetate of an oxo alcohol.

13. The composition of claim 1, wherein the composition contains from about 0.1 to about 50 percent by weight of the carbonate, and from about 0.1 to about 50 percent by weight of the alkyl-substituted cyclo-alkane.

14. A method of manufacturing a degreasing composition, comprising: combining a carbonate and a alkyl-substituted cyclo-alkane and optionally a soy carbonate, wherein the carbonate is an alkylene carbonate, a dialkyl carbonate, or a combination thereof.

15. The method of claim 14, wherein the carbonate is an alkylene carbonate containing from 2 to 10 carbon atoms.

16. The method of claim 14, wherein the carbonate is propylene carbonate or ethylene carbonate or both.

17. The method of claim 14, wherein the carbonate is ethylene carbonate or propylene carbonate.

18. The method of claim 14, further comprising a glycol ether.

19. The method of claim 14, further comprising a glycol ether having up to 20 carbon atoms.

20. The method of claim 14, further comprising a mono-ester.

21. The method of claim 20, wherein the mono-ester includes an ether group.

22. The method of claim 14, wherein the soy carbonate is present.

23. The method of claim 14, further comprising an alkyl lactate.

24. The method of claim 23, wherein the alkyl lactate is ethyl lactate.

25. The method of claim 14, wherein the mono-ester is an alkyl acetate of an oxo alcohol.

26. The method of claim 14, wherein the composition contains from about 0.1 to about 50 percent by weight of the carbonate, and from about 0.1 to about 20 percent by weight of the alkyl-substituted cyclo-alkane.

27. The method of claim 14, wherein the composition contains from about 0.1 to about 50 percent by weight of the carbonate, from about 0.1 to about 50 percent by weight of the alkyl-substituted cyclo-alkane, and the soy carbonate is present and in an amount for from about 0.1 to about 20 percent by weight.

* * * * *